Figure 3:
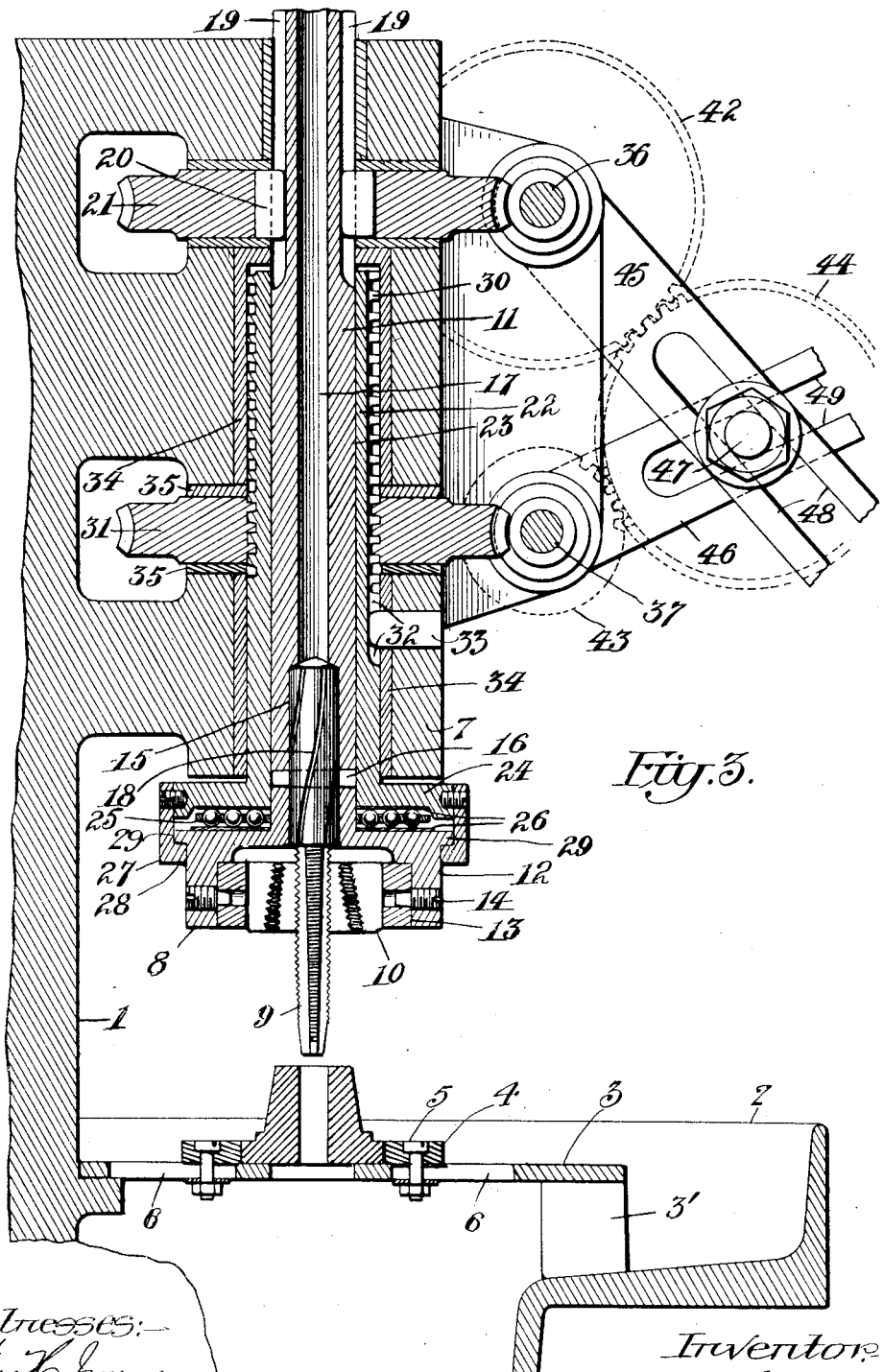

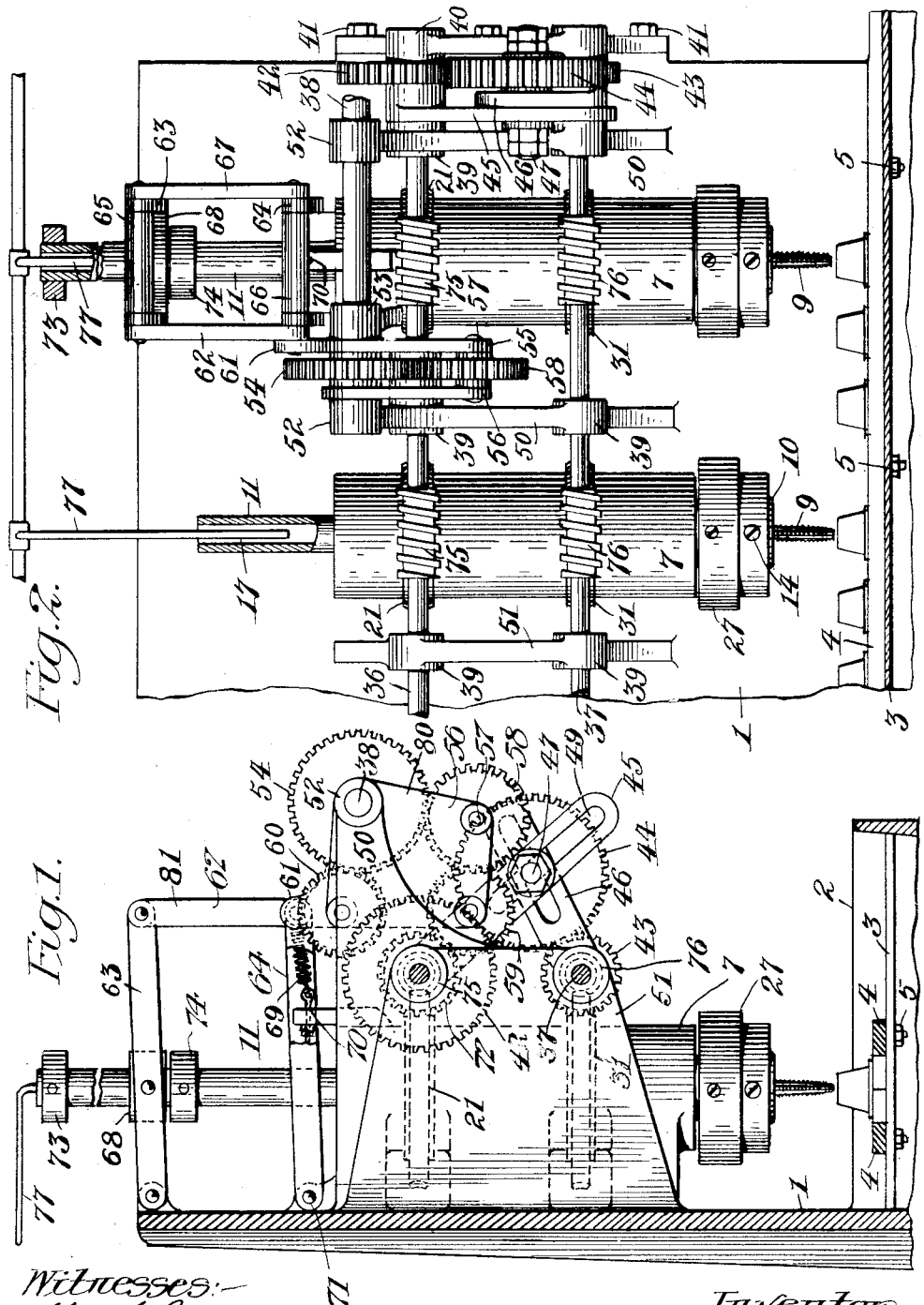
A. B. MATTINGLY.
TOOL FOR CUTTING LOCK NUTS.
APPLICATION FILED DEC. 31, 1914.
1,195,145. Patented Aug. 15, 1916.
3 SHEETS—SHEET 1.

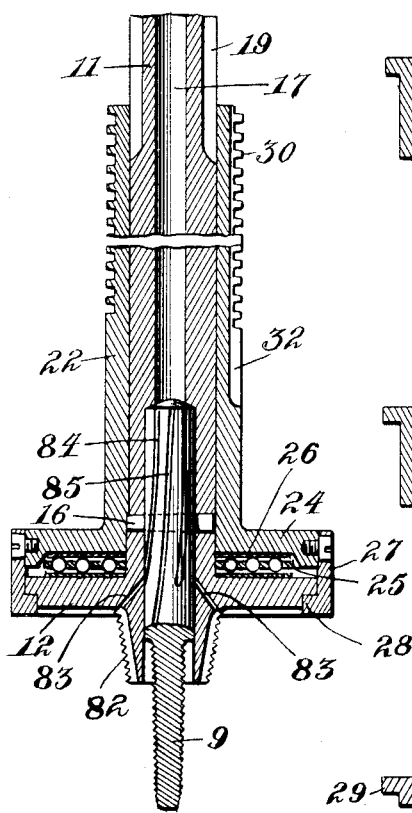
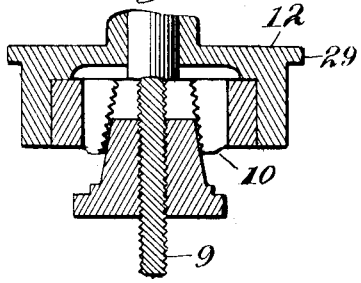
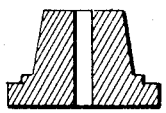
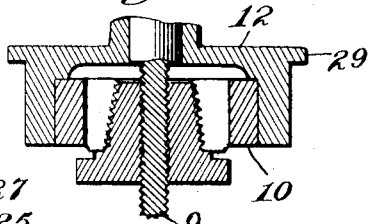
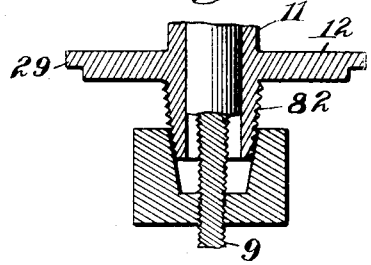
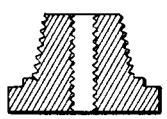
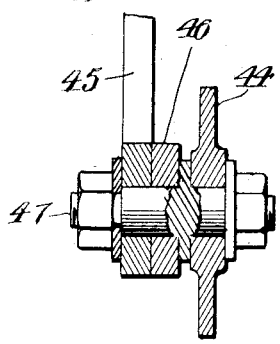
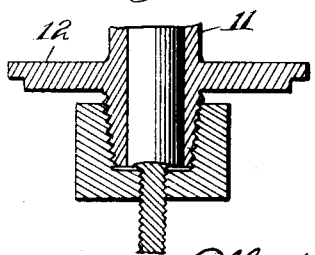
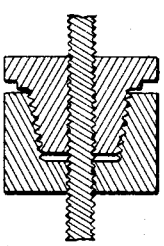

UNITED STATES PATENT OFFICE.

ALBERTUS B. MATTINGLY, OF NEW YORK, N. Y., ASSIGNOR, BY MESNE ASSIGNMENTS, TO NATIONAL POSITIVE LOCK NUT CO., INC., A CORPORATION OF NEW YORK.

TOOL FOR CUTTING LOCK-NUTS.

1,195,145.   Specification of Letters Patent.   Patented Aug. 15, 1916.

Application filed December 31, 1914. Serial No. 879,864.

*To all whom it may concern:*

Be it known that I, ALBERTUS B. MATTINGLY, a citizen of the United States, and a resident of New York, in the county of Bronx and State of New York, have invented certain new and useful Improvements in Tools for Cutting Lock-Nuts, of which the following is a specification.

This invention relates to improvements in tools for manufacturing nuts, and more especially that class of nuts known as lock nuts, and has for its objects speed, accuracy and interchangeability of parts of the manufactured product; and the further objects are to provide a tool of this class which automatically reverses its direction of revolving and travel upon the finishing of cutting the thread, and the prevention of breakage of the taps and dies by the jamming or over crowding of the feed of the taps or dies.

The still further object is to provide a tool of this class in which any part of the tool can be replaced with accuracy relatively to the other parts, or an entire new tool made and its product will be interchangeable with the product of the previous tool or any other tool of the same class.

It will be seen that I have accomplished the foregoing, by referring to the accompanying drawing forming a part of this specification and showing the product and one form of my invention, but it will be understood that many changes and modifications may be made in the different parts without departing from the spirit of my invention as expressed in the claims, and it is not thought necessary to show the modifications in this drawing, in which—

Figure 1 is a side elevation of a portion of my invention or tool; Fig. 2 is a front view of the same; Fig. 3 is a central longitudinal section taken through one of the tapping and threading fixtures; Fig. 4 is a similar view to Fig. 3, showing the tapping fixture for the locking member, but only showing the changeable parts of what is shown in Fig. 3; Figs. 5 to 8 are diagrammatic views illustrating the tapping; Figs. 9 and 10 are sectional views of the screw machine product before being tapped and threaded; Figs. 11 and 12 show the product tapped and threaded which are used as masters for locating and assembling the taps and dies in the spindles; Fig. 13 is a sectional view of the assembled lock nut; Fig. 14 is a detail sectional view of the stud and arms for the idler of the change gears.

Referring to Figs. 1, 2 and 3, it will be seen that I provide a suitable frame 1 in the form of a casting having suitable bearings formed thereon for the operating parts and having a portion 2 in the form of a pan for catching oil and chips, and in which are located the supports 3' and the adjustable guides 4 which are held in position by the bolts 5 which pass through the slots 6 in the supporting plate 3. Any suitable pump or device may be used to take up the oil which accumulates in the pan and pass it over the cutting faces of the taps and dies again. It is not thought necessary to show the oiling system in these drawings.

Located upon the frame 1 are a plurality of vertical bearings 7 in which are carried the operating spindles 8, which carry the taps 9 and dies 10. The operating spindles 8 consist of a plurality of parts, clearly shown in Fig. 3, where it will be seen that the main part of the spindle 8 is a revolving stem 11 provided with an enlarged end 12 having a chamber 13 for carrying the die 10, which is held in position by a plurality of screws 14 having locating stud ends. The stem 11 is further provided with a central bore 15 in which is located the shank of the tap 9, which is held in position by a key 16. Passing through the stem 11 is an oil hole 17, through which the oil passes to the cutting faces of the taps and dies by means of grooves 18 cut in the shank of the tap. The upper end of the stem 11 is provided with a pair of key-ways 19 in which work the sliding keys 20 of the worm wheel 21 for revolving the stem, and the sliding of the keys allows the stem to be fed up or down, which is done by the feeding sleeve 22 having a bore 23 which fits the stem 11. The sleeve 22 is provided with an enlarged end 24 which forms a part of the race for the ball bearing 25 and hardened plates 26, and further provides a means for securing the sleeve to the stem 11, which is done by the sleeve 27, which has an internal flange 28 working in conjunction with the flange 29 on the upper edge of the enlargement 24 of the stem 11. The feeding sleeve 22 is provided with a very strong and coarse thread 30, which is known as a square thread and is used to feed the spindle 8 either up or down by the worm wheel 31 provided with the same thread. The feeding sleeve 22 is prevented from turning by the keyway 32 and the key 33. The spindle 8 is further provided with suitable bronze bearings 34 and thrust plates 35 located in the bearing 7.

Mounted in suitable bearings is the operating mechanism for driving the spindles 8, which consists of a pair of supplemental shafts 36 and 37 and a main driving shaft 38. All of the bearings 39 for the shafts are integral with the frame 1 except the bearings 40, which are secured to the frame by bolts 41 and dowel pins, the object of this being to allow for the changing of the gears 42, 43 and 44 so as to make the tap and die cut any number of threads to the inch, which is done by making the two shafts 36 and 37 revolve at different speeds. For the sake of illustration, a thread of twelve threads to the inch is to be cut with the feeding sleeve having four threads to the inch. The shaft 36 will be revolved three times as fast as the shaft 37, thus causing the worm wheel 21 to revolve the spindle 8 twelve times while the worm wheel 31 is making four revolutions and feeding the spindle down one inch. If eight threads are to be cut to the inch, then the shaft 36 revolves twice as fast as the shaft 37, or if both shafts run at the same speed the cut will be four threads to the inch. Thus it will be seen that by changing the gears 42, 43 and 44 any number of threads to the inch can be cut. This is done by simply removing the bearing 40 and putting on the end of the shafts 36 and 37, which are provided with keys to fit the key-ways in the gears, any desired combination of gears and adjusting the swinging arms 45 and 46, (by first loosening the locking stud 47 which moves in the slots 48 and 49), so that the idler 44 meshes with the two gears 42 and 43.

Located on the two projecting flanges 50, which are different from the flanges 51 in the respect that they each carry an extra bearing 52 is the main driving shaft 38, which also has a bearing 53 formed on the bearings 7 which is located between them. The main driving shaft is provided with a driving gear 54 keyed thereto and having located on each side of the gear 54 swing plates 55 and 56, which swing on the main driving shaft 38 and in turn are provided with three short shafts 57 upon which revolve a pair of idlers 58 and 59 and a free running gear 60, (which acts as an idler for reversing the movements of the spindles). The shafts 57 tie the plates 55 and 56 together, thus forming a swing frame 80 for the idlers. The plate 55 is provided with an ear 61, which is connected to a pivoted link 62, which is a part of the reversing mechanism, which consists of two pairs of parallel pivoted levers 63 and 64 pivoted to the frame 1 and having their outer ends connected by shafts 65 and 66, and the levers 63 and 64 are connected together by links 62 and 67, thus forming a parallel moving frame which is provided with a sleeve 68 through which freely passes the stem 11, and the sleeve is pivotally mounted between the pair of levers 63. The shaft 66 is connected to the bearing 7 by a strong spring 69 at a point 70 which is horizontally in line or on dead center with the pivot bearing 71 of the levers 64. This causes the frame to move rapidly in either direction from the dead center and form a tension to keep the gears 59 and 60 in mesh with the gear 72 of the secondary driving shaft 36, in accordance with which side of the center 71 the shaft 66 is on, and hold the gears in mesh until the collars 73 or 74 on the stem 11 have caused the shaft 66 to alter its position relatively to the center 71.

It will be noted and seen by referring to Fig. 2, that the above mechanism which is described is only necessary for one spindle, and as many spindles as desired may be operated by the shafts 36 and 37 by duplicating the worms 75 and 76, and the spindle or its parts shown in Fig. 3.

It will be seen by referring to Figs. 2, 3 and 4 that when it is desired to cut the locking members after sufficient nuts have been made the plate 3 is removed and the collars 73 and 74 are unlocked and the shaft 37 run slowly until all the spindles are fed out of their bearings. Then the spindles shown in Fig. 4 are inserted in their places and the collars 73 and 74 adjusted and locked in position to give the proper feed and the plate 3 put back.

In case of a tap or die breaking it can be renewed. For illustration, if the die is broken a new die is made, and while soft is screwed upon the master nut shown in Fig. 11. Then the master is screwed on the tap 9 in the spindle. This locates the new die relatively to the tap and then the holes are drilled for the screws 14, the spindle being used as a jig. The die is then taken out and hardened. If the tap is to be replaced the operations are as above, and the hole is made for the key 16, using the spindle for the jig. It will be seen from the above that absolute accuracy is secured in the making of the tools.

Referring to Figs. 5 to 8, it will be seen that the straight thread for the bolt of the nut and the locking member are almost completely cut and the upper part of the tap 9 is used as a guide when the die starts in to cut the tapered threads.

The operation of the tool is as follows: The main driving shaft runs in one direction only and in turn drives the shaft 36 through the idlers 58 and 59 and the gear 72, (of the shaft 36). Worms 75 drive or rotate all of the spindles 8 through the worm wheels 21. The shaft 36, through change gears 42, 44 and 43, drives the shaft 37 at the proper speed, and it in turn drives, through the worms 76 on it, all of the worm wheels 31 which feed the spindles down at the proper speed, cutting the threads on the nuts or locking members. When the threads are almost finished the collar 73 comes into contact with the collar 68 and gradually depresses it, forcing down the levers 63 and 64 and the links 62 and 67, and at the finish of the cutting of the threads the shaft 66 is just past the center 71 of the levers 64, whereupon the spring 69 causes a quick and further downward movement of the reversing frame 81 and thus causes the idler frame 80 to swing on the driving shaft and throw the idler 59 out of mesh with the gear 72 and the free running idler 60 into mesh with the gear 72, thus causing the reverse rotation of the shafts 36 and 37, which in turn causes the spindles to reverse their direction of rotation and to be fed upward at the proper speed so as not to carry the nuts up with them. As soon as the taps are out of the nuts new blanks are placed in position, and when the collar 74 reaches the collar 68 the reversing mechanism operates in the reverse directions already described and the cycle of movements is repeated for the next nut.

While the tools are in operation oil is fed by means of tubes 77 into the bore 17 of the stem 11 of the spindles and passes to the cutting faces of the taps and dies.

Referring to Fig. 4, it will be seen that the construction of the spindle 8 is slightly different from the one shown in Fig. 3. This is necessary owing to the fact that the locking member requires two female threads, one straight and the other tapered and the nut has a straight female thread and a male tapered thread. It will be noted that in the spindle shown in Fig. 4 the chamber 13 is dispensed with and a tap 82 is formed integral with the enlarged end 12, in which oil holes 83 are provided which register with the short grooves 84 which do not run to the bottom of the shank of the tap 9. The grooves 84 and holes 83 are for feeding oil to the cutting faces of the tap 82 from the reservoir 17. Other grooves 85 are formed on the shank of tap 9 which feed the oil from the reservoir to its cutting faces.

Having thus described my invention, what I claim is:

1. In a double threading machine, the combination of a frame having a journal portion, a casing slidable in the frame and locked against rotation therein, means for advancing the casing, a spindle rotatably carried by the casing but caused to advance therewith, a tap carried by the lower end of the spindle, and an annular tap also carried by the spindle and surrounding the said tap to operate on the blank simultaneously therewith.

2. In a double threading machine, the combination of a frame having a journal portion, a casing slidable in the frame and locked against rotation therein, a spindle rotatably carried by the casing but caused to advance therewith, a tap carried by the lower end of the spindle, an annular tap also carried by the spindle and surrounding said tap to operate on the blank simultaneously therewith, driving means for rotating the spindle, and means connected with the driving means for advancing the casing.

3. In a double threading machine, the combination of a frame having a journal portion, a casing slidable in the frame and locked against rotation therein, means for advancing the casing, a spindle rotatably carried by the casing but caused to advance therewith, a tap carried by the lower end of the spindle, an annular tapered tap adapted to cut a tapered thread and carried by the spindle and surrounding said tap to operate on the blank simultaneously therewith.

4. In a double threading machine, the combination of a frame having a journal portion, a casing slidable in the frame and locked against rotation therein, means for advancing the casing, a spindle rotatably carried by the casing but caused to advance therewith, a tap carried by the lower end of the spindle, and an annular tap adapted to cut a tapered thread and carried by the spindle and surrounding said tap to operate on the blank simultaneously therewith, the spindle having a thrust bearing in the casing.

5. In a threading machine, the combination of a frame having a journal portion, a casing slidable in the frame and locked against rotation, a spindle rotatably carried by the casing but caused to advance therewith, a head on the lower end of the casing, a head on the spindle having a thrust bearing in said head, an annular tap adapted to cut a tapered thread carried by the spindle head, a tap carried by the spindle and extending through the annular tap to engage a blank simultaneously therewith, a worm wheel secured to the spindle, a worm engaging the worm wheel to rotate the spindle, said casing being threaded externally, a worm wheel in the frame having a threaded bore engaging the threaded casing to advance the casing, a worm engaging the last mentioned worm wheel, and driving means for rotating both said worms.

6. In a threading machine, the combination of a frame having a journal portion, a casing slidable in the frame and locked against rotation, a spindle rotatably carried by the casing but caused to advance therewith, a head on the lower end of the casing, a head on the spindle having a thrust bearing in said head, an annular tap adapted to cut a tapered thread and carried by the spindle head, a tap carried by the spindle and extending through said tap to engage a blank simultaneously therewith, a worm wheel secured to the spindle, a worm engaging the worm wheel to rotate the spindle, said casing being threaded externally, a worm wheel in the frame having a threaded bore engaging the threaded casing to advance the casing, a worm engaging the last mentioned worm wheel, and interchangeable driving means for rotating both said worms at different relative speeds.

7. In a double threading tool, the combination of a frame having a journal portion, a casing slidable in the frame and locked against rotation therein, means for advancing the casing, a spindle rotatably carried by the casing but caused to advance therewith, a tap carried by the lower end of the spindle, and an annular tap adapted to cut a tapered thread and carried by the spindle and surrounding said tap to operate on the blank simultaneously therewith, said spindle having an oil bore, an oil channel in the tap shank to feed oil on the tap, and an oil channel in the annular tap to feed oil on the blank.

8. In a double threading machine, the combination of a frame having a journal portion, a casing slidable in the frame and locked against rotation therein, means for advancing the casing, a spindle rotatably carried by the casing but caused to advance therewith, a threading tool carried by the lower end of the spindle, and an annular threading tool also carried by the spindle and surrrounding the said threading tool to operate on the blank simultaneously therewith.

9. In a double threading machine, the combination of a frame having a journal portion, a casing slidable in the frame and locked against rotation therein, a spindle rotatably carried by the casing but caused to advance therewith, a threading tool carried by the lower end of the spindle, an annular threading tool also carried by the spindle and surrounding said threading tool to operate on the blank simultaneously therewith, driving means for rotating the spindle, and means connected with the driving means for advancing the casing.

10. In a double threading machine, the combination of a frame having a journal portion, a casing slidable in the frame and locked against rotation therein, means for advancing the casing, a spindle rotatably carried by the casing but caused to advance therewith, a threading tool carried by the lower end of the spindle, an annular tapered threading tool adapted to cut a tapered thread and carried by the spindle and surrounding said threading tool to operate on the blank simultaneously therewith.

11. In a double threading machine, the combination of a frame having a journal portion, a casing slidable in the frame and locked against rotation therein, means for advancing the casing, a spindle rotatably carried by the casing but caused to advance therewith, a threading tool carried by the lower end of the spindle, and an annular threading tool adapted to cut a tapered thread and carried by the spindle and surrounding said threading tool to operate on the blank simultaneously therewith, the spindle having a thrust bearing in the casing.

12. In a threading machine, the combination of a frame having a journal portion, a casing slidable in the frame and locked against rotation, a spindle rotatably carried by the casing but caused to advance therewith, a head on the lower end of the casing, a head on the spindle having a thrust bearing in said head, an annular threading tool adapted to cut a tapered thread carried by the spindle head, a threading tool carried by the spindle and extending through the threading tool to engage a blank simultaneously therewith, a worm wheel secured to the spindle, a worm engaging the worm wheel to rotate the spindle, said casing being threaded externally, a worm wheel in the frame having a threaded bore engaging the threaded casing to advance the casing, a worm engaging the last mentioned worm wheel, and driving means for rotating both said worms.

13. In a threading machine, the combination of a frame having a journal portion, a casing slidable in the frame and locked against rotation, a spindle rotatably carried by the casing but caused to advance therewith, a head on the lower end of the casing, a head on the spindle having a thrust bearing in said head, an annular threading tool adapted to cut a tapered thread and carried by the spindle head, a threading tool carried by the spindle and extending through said tap to engage a blank simultaneous therewith, a worm wheel secured to the spindle, a worm engaging the worm wheel to rotate the spindle, said casing being threaded externally, a worm wheel in the frame having a threaded bore engaging the threaded casing to advance the casing, a worm engaging the last mentioned worm wheel, and interchangeable driving means for rotating both said worms at different relative speeds.

14. In a double threading tool, the combination of a frame having a journal portion, a casing slidable in the frame and locked against rotation therein, means for advancing the casing, a spindle rotatably carried by the casing but caused to advance therewith, a threading tool carried by the lower end of the spindle, and an annular threading tool adapted to cut a tapered thread and carried by the spindle and surrounding said threading tool to operate on the blank simultaneously therewith, said spindle having an oil bore, an oil channel in the tap shank to feed oil on the threading tool, and an oil channel in the annular tap to feed oil on the blank.

Signed at New York, in the county of Bronx and State of New York, this 30 day of December, A. D. 1914.

ALBERTUS B. MATTINGLY.

Witnesses:
J. W. HAZLETT,
L. E. SCHWAB.

Copies of this patent may be obtained for five cents each, by addressing the "Commissioner of Patents, Washington, D. C."